United States Patent [19]

Glass

[11] Patent Number: 6,011,625
[45] Date of Patent: Jan. 4, 2000

[54] METHOD FOR PHASE UNWRAPPING IN IMAGING SYSTEMS

[75] Inventor: Carter M. Glass, Littleton, Colo.

[73] Assignee: Lockheed Martin Corporation, Bethesda, Md.

[21] Appl. No.: 09/112,049

[22] Filed: Jul. 8, 1998

[51] Int. Cl.[7] .................................................. G01B 9/02
[52] U.S. Cl. ........................... 356/357; 356/359; 342/25
[58] Field of Search .................................... 356/357, 359, 356/360; 342/25

[56] References Cited

U.S. PATENT DOCUMENTS

| | | | |
|---|---|---|---|
| 5,608,405 | 3/1997 | Pritt | 342/25 |
| 5,659,318 | 8/1997 | Madsen et al. | 342/25 |
| 5,680,138 | 10/1997 | Pritt | 342/169 |

OTHER PUBLICATIONS

Ghiglia, D., and Pritt, M., "Two–Dimensional Phase Unwrapping, Theory, Algorithms, and Software," 1998.

Jakowats, Charles V., Jr., Wahl, Daniel E., Eichel, Paul H., Thompson, Paul A., "Spotlight–Mode Synthetic Aperture Radar: A signal Processing Approach," 1996.

Ghiglia, D.C. and Romero, L.A., "Robust two–dimensional weighted and unweighted phase unwrapping that uses fast transforms and interactive methods," J. Optical Society of America, Jan. 1994, vol. 11, No. 1, pp. 107–117.

Goldstein, Richard M., Zebker, Howard A., Werner, Charles, L. "Satellite radar interferometry: Two–dimensional phase unwrapping," Radio Science, Jul.–Aug. 1998, vol. 23, No. 4, pp. 713–720.

Ghiglia, Dennis C., Romero, Louis A., "Direct phase estimation from phase differences using fast elliptic partial differential equation solvers," Optics Letters, Oct. 15, 1980, vol. 14, No. 20, pp. 1107–1109.

Pritt, Mark D., Shipman, Jerome S., "Least–Squares Two–Dimensional Phase Unwrapping Using FFT's," IEEE Transactions on Geoscience and Remote Sensing, May vol. 32, No. 3, 1994, pp. 706–708.

Hunt, B. R., "Matrix formulation of the reconstruction of phase values from phase differences," J. Optical Society of America, vol. 69, No. 3, Mar. 1979, pp. 393–399.

Pritt, Mark D., "Congruence in Least–Squares Phase Unwrapping," Lockheed–Martin Federal Systems, date unknown.

Zebker, Howard A., Werner, Charles L., Rosen, Paul A., Hensley, Scott; "Accuracy of Topographic Maps Derived from ERS–1 Interferometric Radar," IEEE Transactions on Geoscience and Remote Sensing, vol. 32, No. 4, Jul. 1994, pp. 823–836.

Pritt, Mark D., "Comparison of Path–Following and Least-–Squares Phase Unwrapping Algorithms," Lockheed–Martin Federal Systems, date unknown.

*Primary Examiner*—Robert H. Kim
*Assistant Examiner*—Andrew H. Lee
*Attorney, Agent, or Firm*—Holme Roberts & Owen LLP

[57] ABSTRACT

An improved method is provided for phase unwrapping in coherent imaging systems which use two complex images to form an interferogram. In the improved method, the interferogram of phase differences is divided into a relatively large plurality of transform blocks, wherein each transform block comprises a matrix of o×p data samples, with o and $p=2^n+1$, and n being an integer greater than 2. Further, adjacent transform blocks are preferably defined to partially overlap. The wrapped phase values of adjacent data samples within each transform block are then compared and if the difference therebetween exceeds a predetermined value, the entire block of data samples may be discarded for further use. Data samples of the retained transform blocks are then unwrapped to obtain phase values via an unweighted, least-squares technique implemented by Fast Fourier Transform. Using a known height value corresponding with a single data sample, an integration constant can be determined for a corresponding first transform block. Path-following may then be used to determine an integration constant for the other retained transform blocks. The phase values and integration constants may then be employed to determine height values for the interferogram. The disclosed method yields enhanced accuracy with reduced computational burden.

27 Claims, 5 Drawing Sheets

METHOD FOR PHASE UNWRAPPING IN IMAGING SYSTEMS

FIELD OF THE INVENTION

The present invention relates to coherent imaging systems in which two complex images of an imaged region may be merged to interfere in such a way as to cancel the image components which are common to both images and recover the information that is transduced by image-domain phase data. More particularly, the present invention pertains to an improved method for phase unwrapping in such imaging systems, and is particularly apt for application to interferometric synthetic aperture radar (IFSAR) applications to determine terrain height within an imaged terrain region. In this regard, the invention may be implemented to supplement and thereby improve known IFSAR processing systems, such as the systems disclosed in C. Jakowatz, Jr., D. Wahl, P. Eichel, D. Ghiglia and P. Thompson, SPOTLIGHT—MODE SYNTHETIC APERTURE RADAR: A Signal Processing Approach (1996), and D. GHIGLIA and M. PRITT, TWO DIMENSIONAL PHASE UNWRAPPING THEORY, ALGORITHMS AND SOFTWARE (1998), hereby incorporated by reference in their entirety.

BACKGROUND OF THE INVENTION

Computed imaging systems are now widely employed in a variety of applications, including medicine, astronomy and terrain analysis. Imaging modalities used for such applications include computer tomography, magnetic resonance imaging, ultrasound, synthetic aperture radar and radio astronomy.

Of particular interest here, synthetic aperture radars (SARs) have been employed to produce high-quality images of the earth's terrain. Such images are obtained by overhead transmission/receipt of pulses of microwave energy at a predetermined frequency. In this regard SARs provide particular functionality due to their capability to image in darkness and to penetrate cloud-cover. Further, because SAR systems use a form of coherent illumination, SAR systems are capable of transducing the complex reflectivity of terrain within an imaged region. In such applications, the reflectivity function is modulated by phase terms that are dependent upon the imaging system geometry. As a result, when two SAR images are made of an imaged region, it is possible to interfere the two complex images in such a way as to cancel the scene reflectivity which is common to both images and recover the information that contains the scene topography transduced by the image-domain phase data. Such systems may be generally referred to as interferometric synthetic aperture radar (IFSAR) systems.

IFSAR systems, both aircraft and space borne, have been used with moderate success to date to provide terrain height for regions on the earth's surface. Such systems may consist of a single vehicle having one radar transmitter and two spaced receive antennas mounted thereupon, wherein two complex images of an image region may be obtained upon a single pass of the vehicle over an imaged region. Alternatively, the system may comprise one or more vehicles that each have one radar transmitter and one receive antenna mounted thereupon, wherein two complex images are obtained by passing over an imaged region twice. In either case, two complex images of the same region are formed. After acquisition, the images may be registered such that the phase differences between corresponding image pixels, or data samples, may be extracted to form an interferogram. As will be appreciated, the phase differences reflected by the interferogram are wrapped. That is, the phase differences are ambiguous module two pi ($2,\pi$).

In order to derive height information from the interferogram, the wrapped phase differences must be unwrapped and corresponding integration constants must be determined. As such, phase unwrapping should be completed in a manner that resolves the $2\pi$ ambiguities so that unambiguous terrain heights can be assigned to the phase values. In addressing such task, it has been recognized that the imaged terrain cannot be of a nature that yields phase values that exceed the Nyquist rate without adversely impacting the accuracy of results.

Specifically, adjacent sample-to-sample phase differences of unwrapped interferometric data should be no more than 180°. Such limitation can become problematic when the imaged region comprises steep pastoral terrain (e.g., near vertical natural geographical features) or cultural features (e.g., man-made structures such as buildings). When such features are present, phase unwrapping may result in inconsistent data that renders the entire height estimation unreliable.

To understand such inconsistencies, consider a closed path consisting of one step forward, a step to the left, a step to the left again, and then a final step to the left. After the four steps, one should active back at the starting point. Interferometric differential phase data is supposed to represent terrain height, but in situations that present the above-mentioned problem (i.e., adjacent samples whose phase difference is >180 °), it is possible that the sum of phase differences around a closed, four-point path in the interferogram is non-zero. Such a result would indicate that if one converted the phase differences to height differences and summed them around the path, one would not arrive back at the starting height.

Existing phase unwrapping algorithms are of two general types: least squares and path following. Least-squares algorithms determine the phase surface which best fits the ensemble of pixel-to-pixel phase differences over the entire interferogram. If inconsistencies of the above-noted nature are present, the least-squares process attempts to minimize their deleterious effects by minimizing the residual fitting error. Path-following algorithms, on the other hand, numerically integrate the pixel-to-pixel phase differences over the interferogram, in the process either avoiding or minimizing inconsistencies by selecting closed paths where error is minimized.

Systems based on these methods have not been able to meet the requirements of many potential applications. To date, IFSAR systems have achieved accuracies of a few meters on the average. But because of "errors" in the unwrapping algorithms (i.e., due to the noted inconsistencies), accuracies may be excellent in one region of the image and quite poor in another, and one has no way of knowing which regions are good and which are bad. Further, future systems are desired which can provide sub-meter accuracies with a high degree of assurance. The noted phase unwrapping techniques are not up to the task.

In this regard, both least-squares and path following algorithms can be undermined by terrain characteristics that are relatively common. By way of example, if the number of inconsistencies in an imaged region is large, the least-squares solution is impractically crude because the effects of the bad data are smeared throughout the image. If one has a priori knowledge of regions of defective data, then a weighted least-squares can be used which assigns low, or zero weight to poor data. To date, however, no one has developed a robust way to determine appropriate weights from the interferogram.

Path-following methods are also undermined by large numbers of inconsistencies because automated techniques for finding satisfactory integration paths fail, and the underlying algorithm cannot complete the unwrapping process. One does not know in advance when such failures will occur.

A final difficulty with existing phase unwrapping methods relates to the need to incorporate large numbers of tie points (i.e., locations within the imaged region having known heights) into the algorithm employed in the corresponding systems. To ensure the best possible accuracy, one should incorporate as many known height tie points as possible.

Neither least-squares nor path-following systems lend themselves to incorporating dense grids of tie points, and this will be needed in future systems which aim for sub-meter accuracies.

SUMMARY OF THE INVENTION

A general objective of the present invention is to provide an improved method for phase unwrapping in imaging systems that employ two complex images, including in particular interferometric synthetic aperture radar (IFSAR) systems. In particular, a primary objective of the present invention is to provide for improved accuracy in height determinations in IFSAR systems.

A further objective of the present invention is to provide a method of phase unwrapping that reduces the use of inconsistent data, thereby yielding enhanced accuracy (e.g., in height determinations for IFSAR applications).

An additional objective of the present invention is to provide a phase unwrapping that can be carried out in a computationally efficient manner.

Yet a further objective of the present invention is to provide a method of phase unwrapping that allows the use of multiple tie points in a convenient and effective manner.

One or more of the above objectives and additional advantages can be realized in the present invention which facilitates the extraction of dimensional, or positional, information from an interferogram generated from two complex images of an imaged region. The method includes the step of dividing the interferogram into a plurality of subregions, or transform blocks, wherein each transform block comprises a plurality of complex data samples that each include a wrapped phase value. In this regard, it has been determined that each transform block should comprise an oxp matrix of data samples, wherein o and p should be equal to $2^n+1$, wherein n is an integer preferably greater than 2, and most preferably greater than 3. Further, each transform block may be advantageously defined to partially overlap each of its neighboring, or adjacent, transform blocks. In this regard, the overlap regions should preferably comprise a number of data supplies that is between about 5% and 50% of the total number of data samples comprising each transform block. As will become apparent, the use of a transform block approach to phase-unwrapping yields a number of benefits in the present invention. Such benefits are particularly apt for use in IFSAR systems, and the present invention will be further summarized in relation thereto.

In one aspect of the present invention, the method comprises unwrapping a phase difference value i) for each of the plurality of complex IFSAR data samples comprising at least a first transform block of an IFSAR interferogram, including an overlapping region with at least a second transform block of an IFSAR interferogram, and ii) for each of the plurality of complex data samples comprising at least the second transform block, including the noted overlapping region. A known height value, or tie point, corresponding with one of the plurality of complex data samples comprising the first transform block is then used to establish an integration constant for the first transform block. Such integration constant can then be employed with the unwrapped phase difference values for the overlapping region to determine an integration constant for the second transform block (i.e., since the average of the unwrapped phase values for the overlapping region of the first transform block can be assumed to be equal to the average of the unwrapped phase values for the corresponding overlapping region of the second transform block). Using this methodology, an integration constant for other ones of the plurality of transform blocks comprising an interferogram can be determined via path-following. As will be appreciated, a height value corresponding with a given complex data sample can be determined using a corresponding unwrapped phase value and an integration constant for the transform block within which the sample is located.

In another aspect of the present invention, the method comprises the step of analyzing each of the plurality of transform blocks comprising an IFSAR interferogram to identify inconsistencies, or ambiguities, in the corresponding data samples. More particularly, such analyzing step may comprise the following substeps that may be carried out prior to any phase unwrapping of the complex data samples: i) determining a difference between the wrapped phase values of each set of adjacent complex data samples comprising a given transform block, and ii) comparing each of the difference values to a predetermined value, wherein all complex data samples comprising a transform block are discarded from further use in the method when any single difference value for the transform block exceeds the predetermined value, and wherein all complex data samples comprising a transform block are retained for further use in the method when all difference values corresponding with the transform block are less than the predetermined value. Such predetermined value may be preferably set to be less than about 135', and even more preferably less than about 90°. As will be appreciated, by discarding transform blocks comprising inconsistent data in the described method, the accuracy achievable by the present invention is enhanced.

In a related aspect of the present invention, the method may comprise the step of unwrapping phase difference values for the data samples comprising each retained transform block (e.g. data samples that have not been discarded pursuant to the above-noted analyzing step), via use of an unweighted least-squares algorithm. Preferably, such algorithm may be implemented by Fast Fourier Transform. As a related consideration, the total number of data samples comprising each transform block should preferably comprise a robust statistical sample of interferometric phase differences (e.g., preferably more than about 100 samples, and most preferably more than about 200 samples). On the other hand, transform blocks should not be excessively large, so that when ambiguities are found, the discarded region is not excessively large.

In one application, an IFSAR system is employed to acquire two complex images of an imaged terrain region. By way of example, such system may comprise a single transmitter for transmitting microwave energy pulses from an airborne or space-borne vehicle toward an imaged region, and a single receiver for receiving microwave energy reflected from within the image terrain region. In such an arrangement, two passes over the imaged region would be necessary to obtain the two complex images. Alternatively, two complex images may be obtained via a single pass when a single transmitter with two receivers are used on the vehicle. After acquisition of the two complex images, the images are spatially registered so that complex data samples corresponding with a given location in the imaged terrain region can be further used. More particularly, following registration, an interferogram can be generated by merging the two complex images. As will be appreciated, the noted complex image merging serves to extract wrapped phase differences between the corresponding pixels or data samples comprising the two complex images.

To facilitate processing, the interferogram may be smoothed using a scanning filter. The interferogram is then divided into a plurality of partially overlapping transfer blocks. By way of example, where an interferogram comprises a matrix of data samples, or pixels, of at least about 4,000 by 4,000, the transform blocks may each be 17×17, or 33×33 data samples. Additionally, the overlapping regions may be on the order of 4 data samples wide.

Upon division of the IFSAR interferogram into the overlapping transform blocks, each transform block may be analyzed for purposes of identifying data inconsistencies (e.g. arising due to data sampling from terrain that exceeds the Nyquist rate). In this regard, the wrapped phase difference values comprising each set of adjacent data samples of the transform block may be compared to determine if the difference therebetween exceeds a predetermined value. In the event any given difference value exceeds the predetermined value (i.e. thereby indicating inconsistent data), the entire transform block of data samples is discarded from further use in the method. In this regard, it has been found that a predetermined value of about 135° or less, or even about 90° or less may be advantageously employed in such analysis. Upon discarding the transform blocks comprising inconsistent data, phase unwrapping of the data samples comprising the retained transform blocks may be conducted using an unweighted least-squares algorithm, as implemented by Fast Fourier Transform.

After unwrapping, phase integration constants corresponding with each retained transform block may be determined. More particularly, in the described IFSAR application, such integration constants may be determined via use of a single-known tie point (i.e., a known height corresponding with a single complex data sample) in combination with a path-following approach. In this regard, it is again noted that since each transform block overlaps its neighbor, the average unwrapped phase values for the corresponding overlap region of any two adjacent transform blocks should be equal. Using this fact, together with the integration constant established using the single known tie-point, the integration constants for other transform blocks may be determined.

In the event that a plurality of adjacent transform blocks of data samples have been discarded (i.e., in the analyzing step) so as to form a band between different regions, or sets, of retained transform blocks, it can be appreciated that one or more sets of retained transform blocks may be rendered "inaccessible" by path-following. In such a situation, a further single known tie point located within an "inaccessible" set of transform blocks may be used to determine the integration constant for the corresponding transform block, and in turn, integration constants may be determined via path-following for the other transform blocks comprising the "inaccessible" region. If a tie point is not known for a given "inaccessible" region, the transform blocks and related data samples comprising such may be discarded (i.e., not retained) from further use in the method.

After determination of the integration constants for each of the retained transform blocks, the unwrapped phase values (in radians or degrees) and integration constants may be used together with a predetermined phase-to-height conversion factor to determine a height value for each data sample comprising the retained transform blocks. The final product is a standard Digital Elevation Model (DEM) of the terrain.

It should be noted that multiple tie points may be readily used at this point in the process to further enhance accuracy. That is, where more than one tie point is known for a set, all adjoining, returned transform blocks, the known tie points that were not previously used (i.e., in the step of determining integration constants) now may be advantageously employed. The additional tie points may be incorporated into the DEM by constrained least-squares methods which adjust the transform block heights (i.e., dimensions) to reduce, or minimize, the squared height differences in the overlap regions. The least-squares constraints are the known tie points.

Numerous extensions, additions and advantages of the present invention will become apparent to those skilled upon further consideration of the description that follows:

DETAILED DESCRIPTION

FIGS. 1–4 are directed to an interferometric synthetic aperture radar (IFSAR) system embodiment of the present invention. As will be appreciated, other applications of the present invention may include magnetic resonance imaging (MRI) and astronomical imaging.

Figure 1:
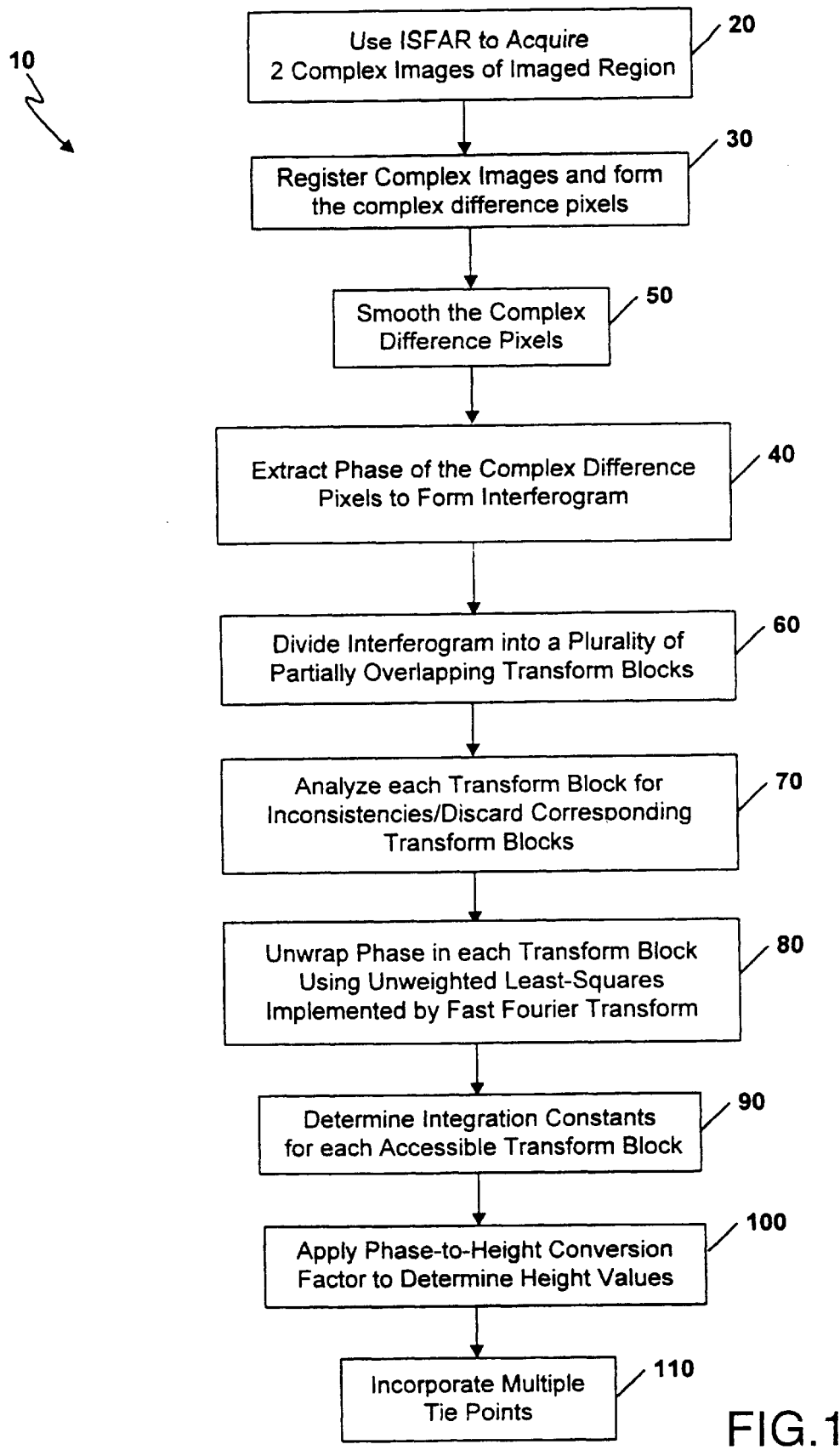
FIG. 1 is a process flow diagram of one embodiment of the present invention.

With reference to FIG. 1, the illustrated IFSAR process embodiment 10 comprises a number of steps. Initially, an IFSAR image acquisition system is used to acquire two complex images of an imaged terrain region (step 20). In this regard, and as will be appreciated, either aircraft or spaceborne vehicles may be used to acquire the two complex images. The images are acquired by transmitting microwave energy pulses at a predetermined frequency toward the imaged terrain region, and receiving resultant microwave energy reflected from the terrain within the region. For each complex image, the received energy is detected in spatial relation to the to the imaged region, demodulated and stored to yield a two-dimensional array of complex sample data. By way of example, a single vehicle may be used with one microwave pulse, or radar, transmitter and two spaced receive antennas to acquire the two complex images during a single pass over the imaged region. Alternatively, one or more vehicles may be employed that each have a radar transmitter and one receive antenna may be employed to obtain two complex images by passing over the imaged region twice. After image data acquisition, demodulation and storage, an image-formation processor may be employed to complete the processing steps contemplated by the illustrated embodiment 10. Such processing may be completed either onboard an imaging vehicle, at a ground-based location, or at some other location remote from the imaging vehicle.

As will be appreciated, the described IFSAR image acquisition system uses a form of coherent illumination to transduce the complex reflectivity of the imaged terrain region.

Such reflectivity function is modulated by phase terms that are dependent upon the imaging system geometry. As a result, when two complex images are acquired by the IFSAR system, the two complex images may be merged to interfere in such a way as to cancel the scene reflectivity which is common to both and to recover the geometric information that contains the topography of the imaged region as transduced by the image-domain phase data. Such phase data is employed to determine height values within the imaged region.

In this regard, following acquisition of the two complex images (step 20), the embodiment 10 of FIG. 1 provides for 2D registration of the images (step 30). This may be done in a variety of ways known in the art. For example, registration may entail the generation of a set of control points or local image-to-image displacement vectors, the calculation of a warping function, and image resampling. In this regard, registration control points may be generated via two-dimensional correlation of image subregions. Warping functions employed in the registration step may be polynomial-based, spline-based, or a combination of the two. A simple bilinear interpolator may be employed for resampling the source image(s) according to the warping function.

In conjunction with registration, step 30 further comprises the formation of complex difference samples, which consist of multiplying each complex pixel from one image by the complex conjugate of the associated pixel from the other image. Such formation of complex difference samples may be presented as follows:

$$\mathcal{O}_{ij}=Arg[P_{ij} \cdot Q_{ij}]$$

where:

$P_{ij}$=sample from one image $Q_{ij}$=complex conjugate of sample from other image; and where the matrix, or plot of $\mathcal{O}_{ij}$ determines an interferogram.

The real and imaginary components of the complex difference samples may then be smoothed (step 40) by a moving averager with dimensions 3 by 3, 5 by 5, or 7 by 7 sample, depending on the quality of the data.

Figure 2A:
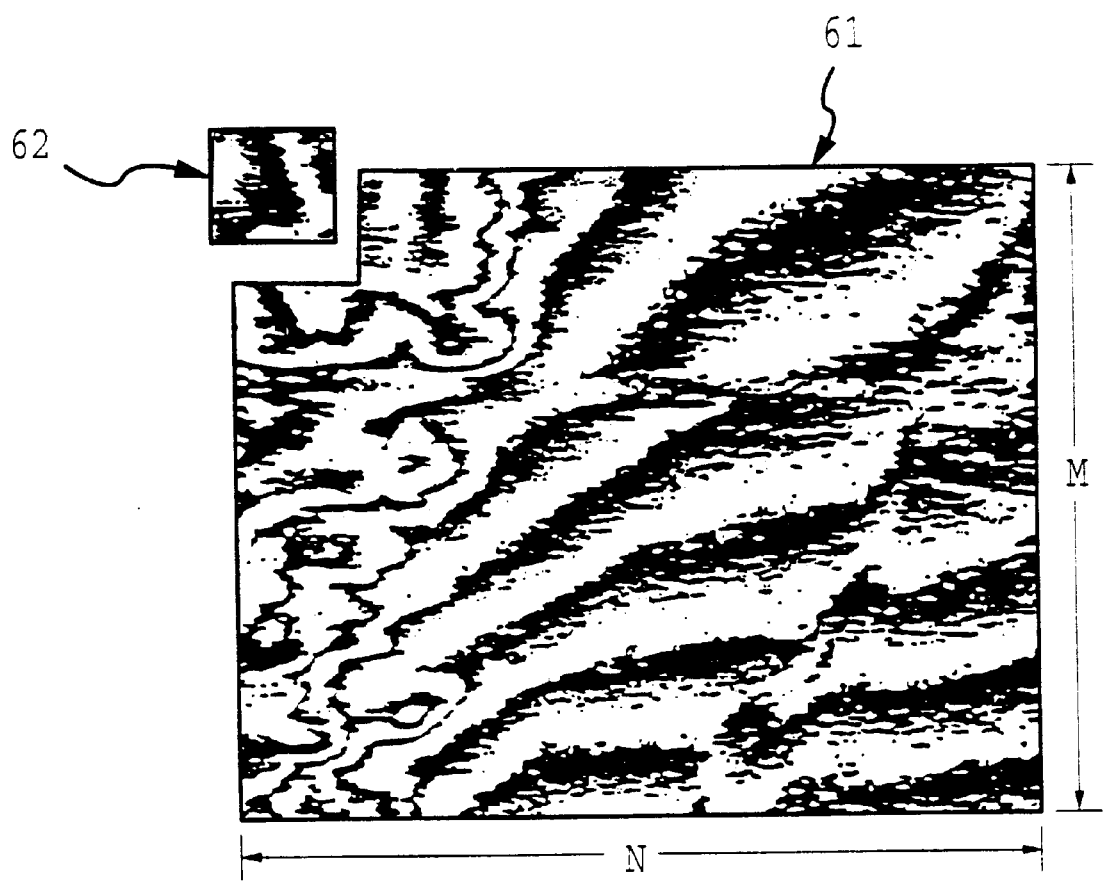
FIGS. 2A and 2B illustrate an exemplary interferogram and a portion thereof divided into overlapping transform blocks, respectively.

As shown in FIG. 1, the process embodiment 10 further comprises the important step of dividing the interferogram into a plurality of partially overlapping transform blocks (step 60). In this regard, FIG. 2A illustrates an exemplary interferogram 61 comprised of a plurality of pixels, or complex difference data samples. By way of example, interferogram 61 may comprise an M×N matrix of data samples, wherein M and N=4000. For purposes of further explanation, a portion 62 of the interferogram 61 has been enlarged in FIG. 2B.

Figure 2B:
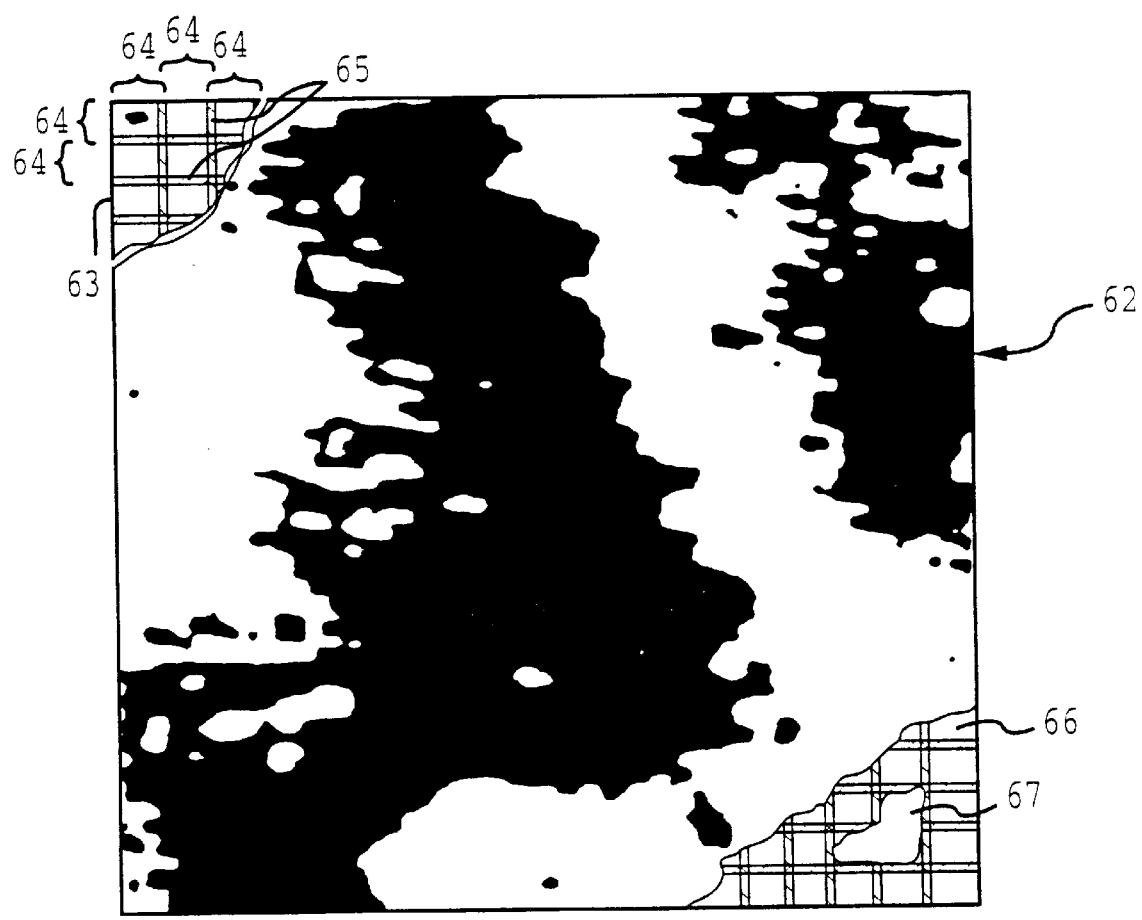
Figure 3:
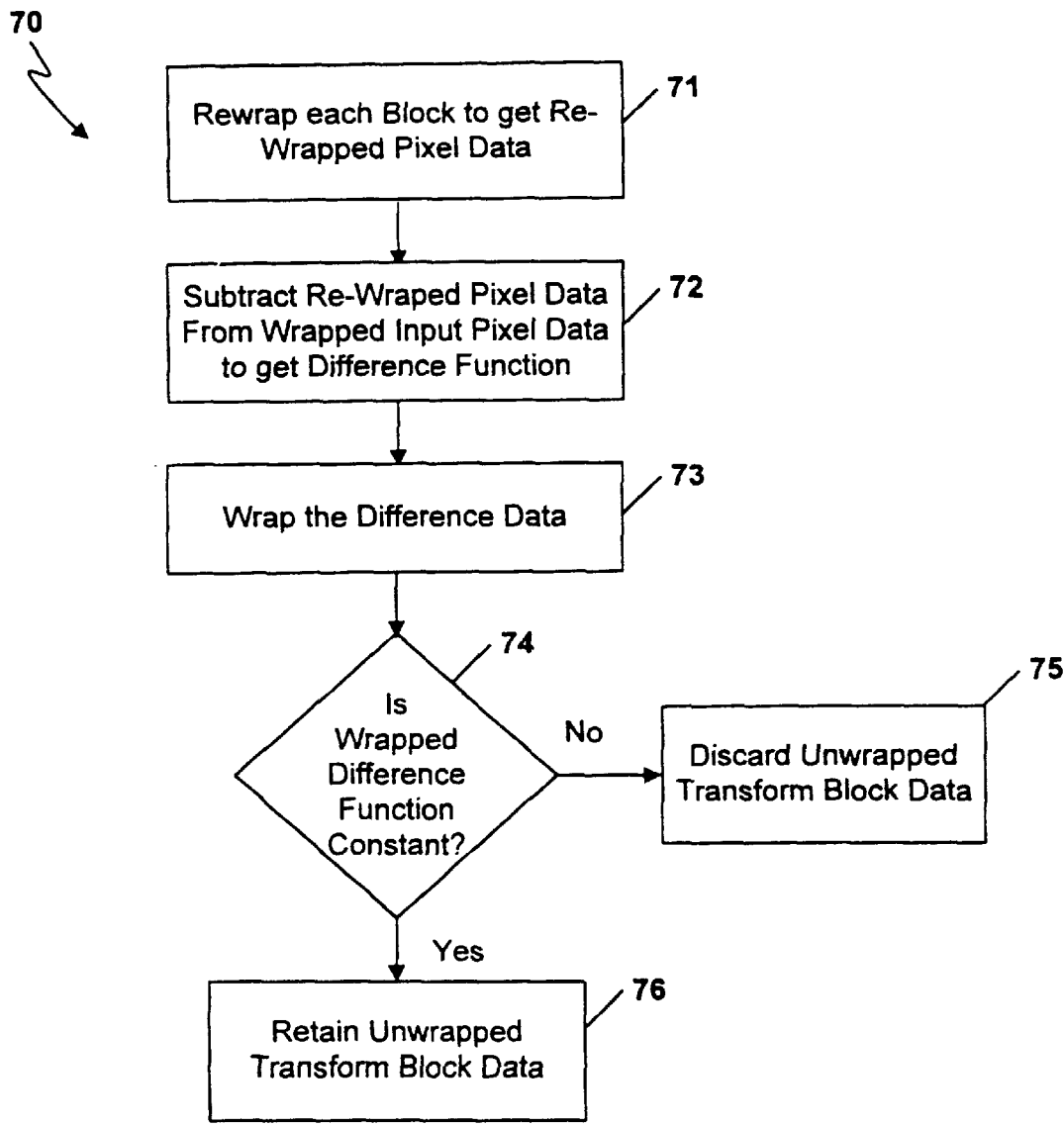
FIG. 3 illustrates process flow substeps of an alternate approach for step 80 of the embodiment of FIG. 1.
Figure 4:
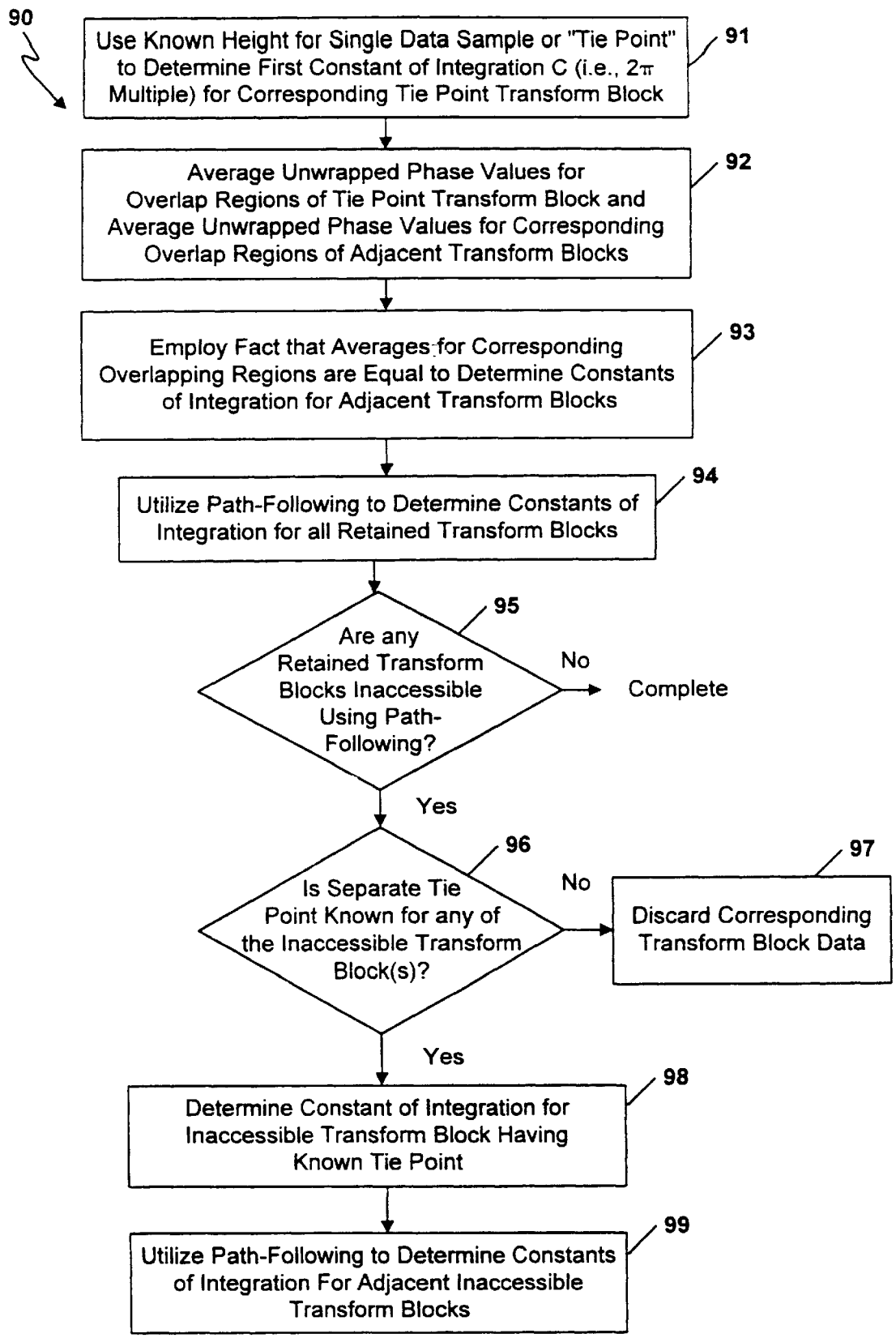
FIG. 4 illustrates process flow substeps for step 90 of the embodiment of FIG. 1.

FIG. 2B includes a corner region 63 of the interferogram portion 62 with a plurality of overlapping transform blocks 64 defined therein. As can be seen, the transform blocks 64 are overlapped to define overlapping regions 65. In one arrangement (e.g., wherein M and N=4000), each transform block 64 may comprise m×n pixels, or complex data samples, (e.g., wherein m and n=17). In such arrangement, each transform block 64 may be established to overlap each of its neighbors by a predetermined band of pixel rows and columns, e.g., each predetermined band being 4 pixels, or data samples, wide.

As will be appreciated upon consideration of the description that follows, the decomposition of interferogram 61 into a relatively large number of overlapping transform blocks 64 yields significant processing efficiencies and other advantages. In this regard, the total number of pixels, or data samples, in each transform block 64 should preferably be at least 100 samples. Further, the total number of pixels, or data samples, in overlapping regions 65, should preferably represent between about 5% to about 50% of the total number of pixels in a transform block 64. It should be noted that while equal-sized transform blocks and equal-sized overlapping regions yield certain processing advantages, the present invention may be employed with differing sizes as well.

Upon defining Overlapping transform blocks in an interferogram (e.g., 61), the next step in process embodiment 10 is to analyze each transform block (e.g., 64) to identify "unacceptable" inconsistencies, wherein blocks which contain such inconsistencies are discarded from further analysis or use in the process (step 70). To conduct such analysis, all adjacent (i.e., sample-to-sample) first-order, wrapped phase differences in an interferogram (e.g., 61) are computed. Such first-order wrapped phase differences are then individually assessed to determine whether or not they lie outside of a predetermined acceptance range.

In this regard, it will be appreciated that if each data sample has been provided at the Nyquist rate with respect to the spatial frequency content of the terrain, the legitimate range of sample-to-sample differences should be between 180° and 180°. In this regard, however, it has been recognized that higher frequency differences between adjacent data samples may alias down into the 180° to 180° range and become indistinguishable. To reduce the possibility of using such contaminated data, the above-noted, specified acceptable range for use in embodiment 10 may be defined as follows:

$$-T \leq \Delta \mathcal{O} T°;$$

wherein T is preferably about 135° (e.g., for 33-by-33 point transform block), and wherein T is even more preferably about 90° (e.g., for a 1 7-by- 17 transform block). If the wrapped first-order phase difference $\Delta \mathcal{O}$ between any two adjacent samples in a given transform block fall outside of the above-noted acceptable range, the data associated with all of the samples in the associated transform block (e.g., 64) is discarded from further analysis. As will be apparent to those skilled in the art, the described approach for handling inconsistencies in the process embodiment 10 yields enhanced accuracy in height estimations.

Referring again to FIG. 1, the process embodiment 10 comprises the further step of unwrapping the phase for each pixel, or data sample, within each retained transform block (step 80) of an interferogram (e.g., 61). In this regard, and particularly since inconsistent data has been discarded, phase unwrapping may be advantageously completed using an unweighted, least-square procedure, implemented by Fast Fourier Transform (FFT). As will be appreciated, the combination of relatively small transform blocks (e.g., 64) in an FFT implementation results in a relatively low computational burden for completing the unwrapping step 80 of the process embodiment 10.

More particularly, in completing the phase unwrapping step 80, an algorithm may be employed that is based on a Z-transform solution of the difference equation that approximates the phase $\varnothing$ at each sample data point in terms of its 4 neighbors. From analytic geometry the slope of the line between points (x1,y1) and (x2,y2) in an interferogram (e.g., 61) may be defined as follows:

$$m_{1,2} = \frac{y_2 - y_1}{x_2 - x_1}.$$

This lets us predict other points on the line from:

$$y - y_1 = m_{1,2} \cdot (x - x_1)$$

Now, consider an array of five points in a plane of wrapped phase values fw(j,k). Using the point-slope equation, we can make four independent predictions of the unwrapped phase value $\phi(j,k)$ based on its four nearest neighbors:

$$\phi_{j,k} = \phi_{j-1,k} + (fw_{j,k} - fw_{j-1,k}) = \phi_{j-1,k} - mj_{j-1,k} \tag{1}$$

$$\phi_{j,k} = \phi_{j+1,k} + (fw_{j,k} - fw_{j+1,k}) = \phi_{j+1,k} - mj_{j,k} \tag{2}$$

$$\phi_{j,k} = \phi_{j,k-1} = (fw_{j,k} - fw_{j,k-1}) + \phi_{j,k-1} - mk_{j,k-1} \tag{3}$$

$$\phi_{j,k} = \phi_{j,l-1} = (fw_{j,k} - fw_{j,k-1,k}) + \phi_{j,k-1} - mk_{j,k} \tag{4}$$

Where the first order differences are defined as:

$$mk_{j,k} + fw_{j,k} - fw_{j,k=1} \tag{5}$$

Under general conditions, the maximum-likelihood estimator of the expected value of a population based on a finite set of samples is the ordinary average. Accordingly, if we average the four independent estimates we get the combined estimator:

$$4 \cdot \phi_{j,k} = \tag{6}$$
$$\phi_{j-1,k} + \phi_{j+1,k} + \phi_{j,k-1} + \phi_{j,k+1} \cdots + mj_{j,k} - mj_{j-1,k} + mk_{j,k} - mk_{j,k-1}.$$

This is precisely the difference equation which must be solved to obtain an unweighted least-squares estimate. The least-squares formulation determines the estimates $\phi(j,k)$ such that the sum of the squared differences between estimated and measured phase slopes is minimized.

The Z-transform is widely used as a way to solve difference equations. The above-noted difference equation is noncausal in that $\phi(j,k)$ is given in terms of both left-hand and right-hand values $\phi(j-1k)$ and $\phi(j+1,k)$. Hence a two-dimensional, two-sided Z-transform is appropriate. The definition is $Z=F(z,u)$ where:

$$F(z, u) = \sum_{j=-\infty}^{\infty} \sum_{k=-\infty}^{\infty} fw_{j,k} \cdot z^{-j} \cdot u^{-k}. \tag{7}$$

Anticipating a solution using the Discrete Fourier Transform (DFT), we transform to one-sided summations with the result:

$$F(z, u) = \sum_{j=0}^{\infty} \Bigg[ \tag{8}$$

$$\sum_{k=0}^{\infty} [(fw_{j,k} \cdot u^{-k} + fw_{j,-k} \cdot u^{k}) \cdot z^{-j} + (fw_{-j,k} \cdot u^{-k} + fw_{-j,k} \cdot u^{k}) \cdot z^{j}] \Bigg];$$

where we have ignored the repeated points at j=0 and k=0. To force a real, periodic solution, we require mirror-image symmetry in the input domain so that the Z-transform is real on the unit circle. To create this symmetry, the data is replicated over the other three quadrants, doubling the dimensions of the array. After this expansion of the data, we have f(j,k)=f(−j,k)=f(j,−k)=f(−j,−k), and the above summation becomes:

$$F(z, u) = \sum_{j=0}^{\infty} \sum_{k=0}^{\infty} fw_{j,k} \cdot [(u^{-k} + u^{k}) \cdot (z^{-j} + z^{j})] \tag{9}$$

After the mirror-image extension, F(z,u) is real and even when evaluated on the unit circle. This is because f(j,k) is real and even, and the z and u terms become real cosines on the unit circle (e.g., $z = \exp(j\omega\Delta t)$).

Continuing with the solution, take Z-transforms of the difference equation to get:

$$4 \cdot \Phi(z,u) + [(z=Z^{-1}) = (u=u^{-1})] \cdot \Phi(z,u) = P(z,u); \tag{10}$$

where:

$$P_{j,k} + mj_{j,k} - mj_{j-1,k} = mk_{j,k} - mk_{j,k-1}; \tag{11}$$

and:

$$\Phi(z,u) = Z(\Phi_{j,k}) \tag{12}$$

and $$P(z,u) = Z(p_{j,k})$$

Solving for $\Phi(z,u)$ yields:

$$\Phi(z, u) = \frac{P(z, u)}{4 - [(z + z^{-1}) + (u + u^{-1})]}. \tag{13}$$

Evaluating on the unit circle leads to:

$$\Phi_{m,n} = \frac{DFT(p_{j,k})_{m,n}}{4 - 2 \cdot \left(\cos\left(\frac{\pi \cdot m}{M}\right) + \cos\left(\frac{\pi \cdot n}{N}\right)\right)}; \tag{14}$$

and the solution is the first-quadrant portion of the inverse Discrete Fourier Transform (DFT), or:

$$\Phi_{j,k} = (DFT(\Phi_{m,n})^{-1})_{j,k} \tag{15}$$

In this regard, it should be appreciated that the invention preferably uses mirror-image array dimensions which are powers of two so that the DFT can be evaluated using the Fast Fourier Transform (FFT). Moreover, a substantial computational advantage results from using many short FFT's rather than a single long one. As a result, decomposing the interferogram (e.g., 61) into small transform blocks (e.g., 64) is computationally more efficient than using large ones.

Note that the denominator of Eq. (14) is zero when, and only when, m=n=0. As a result, the solution is invalid if the value of the numerator is non-zero for m=n=0. Construction of the mirror-image data, along with specified boundary conditions on the second differences, ensure that the second differences sum to zero over the transform block (e.g., 64). This results in a zero value for the (0,0) bin of the numerator transform, and hence a valid solution.

It should also be noted that in a modified embodiment, step 70 in FIG. 1 may be completed after the phase unwrapping step 80. In such modified embodiment, the analysis of transform blocks (e.g., 64) to identify inconsistencies (step 70) may be completed in a manner illustrated in FIG. 3. Briefly, each transform block (e.g., 64) may be rewrapped to obtain rewrapped pixel data (step 71). The rewrapped pixel data may then be subtracted from the initial wrapped pixel data to obtain a difference function (step 72). The difference data may then be wrapped (step 73) and evaluated (step 74). Such evaluation may comprise a determination of whether the wrapped difference function is constant (step 74). If not, the corresponding data for an entire transform block (e.g., 64) is discarded from further analysis in the process. If the difference function is constant, then the data corresponding with the evaluated transform block (e.g., 64) is retained for further processing in the method.

Returning now to the embodiment 10 of FIG. 1, following the phase unwrapping step 80, integration constants for each of the retained transform blocks (e.g., 64) are determined (step 90). In this regard, it is noted that the phase values in the retained, unwrapped transform blocks (e.g., 64) are valid only to within an arbitrary constant. But since each transform block overlaps its neighbors (e.g., by a band of four samples), and since imaged terrain is unique, the average value of the unwrapped phase values in the overlap regions (e.g., 65) must be the same for neighboring blocks, thereby allowing the constants for adjoining, retained blocks to be determined.

More particularly, resolution of the constants may be achieved by first using a single known tie point to determine the constant for one of the blocks. Then given the commonality of the overlap regions (e.g., 65), the constants for all of the other accessible, retained blocks (e.g., 64) may be determined by path-following. This procedure can be repeated for all sets of disjointed transform blocks (i.e., sets that are not accessible via a path to a resolved transform block set due to the discarding of transform blocks in step 70 above), provided that a tie point is known with respect to each of the sets. The specific procedure is further described below with reference to FIG. 4.

Let indices (u,v) count transform blocks (e.g., 64) comprising an interferogram (e.g., 61). Let L(u,v), R(u,v), U(u,v), and D(u,v) be the average unwrapped phase values in the left (decreasing v), right (increasing v), up (decreasing u), and down (increasing u) overlap regions (e.g., 65) of block (u,v). Let C(u,v) be the constant of integration for block (u,v). Then, with respect to their four neighbors, the constants C(u,v) must satisfy:

$$L_{u,v} + C_{u,v} = R_{u,v-1} + C_{u,v-1} \quad (16)$$

$$R_{u,v} + C_{u,v} = L_{u,v+1} + C_{u,v+1}$$

$$U_{u,v} + C_{u,v} = D_{u-1,v} + C_{u-1,v}$$

$$D_{u,v} + C_{u,v} = U_{u+1,v} + C_{u+1,v}$$

Accordingly, if one knows a height value for a single data sample within a given transform block (u,v), i.e., a known "tie point", a corresponding value for a constant of integration for the transform block C(u,v) can be established (step 91). In turn, the above-noted expressions can be used to determine the constants for the neighboring blocks. More particularly, the unwrapped phase values can be averaged for the overwrap regions of the tie point transform block and for the corresponding overlap regions of adjacent transform blocks 92. Since the averages for corresponding overlap regions should be equal, the constant for the transform block containing the tie point can be used to determine the constant for adjacent transform blocks (step 93). In turn, a path-following approach can be used to determine the constants of integration for all retained transform blocks (step 94). In the event that sets of retained transform blocks are inaccessible by path-following (e.g., as a result of the discarding of data for transform blocks in step 70), additional tie point information may be needed to determine the constants for the inaccessible transform blocks (see step 95).

By way of example and referring to FIG. 2B, assume that the transform blocks 64 within region 66 are all discarded in step 70 due to inconsistencies found therewithin. In such a situation, region 67 of the interferogram portion 62 may be rendered inaccessible via path-following. In such a situation, it would be necessary to have another known height to establish a tie point within the region 67 (step 96) in order to determine constants of integration for the transform blocks 64 with such region 67 (step 98). In the event that another tie point within region 67 is known, then path-following may be used within region 67 to determine integration constants for the various transform blocks with region 67 (step 99). if not, the transform blocks within region 67 may be discarded from further use in the method.

It is noted that, over the ensemble of blocks spanned by indices (u,v), the system of equations for the constants is overdetermined, making it theoretically possible for the resulting set of constants to be inconsistent, which would result in erroneous height shears when the blocks are mosaiced together. Such inconsistencies do not occur in interferograms from authentic terrain, but they can be induced if an interferogram (e.g., 61) is smoothed so severely that regions heavily tainted by noise are transformed into consistent phase data. This situation is minimized or avoided by ensuring that the span of the smoothing filter used in step 50 hereinabove is no more than about half of the size of a transform block. In this regard, the amount of smoothing in step 50 can be typically done with filter spans of 3-by-3, 5-by-5, or 7-by-7 data samples, all of which are compatible with the 17-by-17 or 33 -by-33 transform blocks.

After the constants of integration for retained transform blocks (e.g., 64) have been found, the unwrapped phase values may be converted to terrain height by using the constants and applying an interferometric phase-to-height conversion factor S (step 100), which is nominally constant over the span of transform block indices (u,v). Accordingly, the transform height values are given by:

$$h_{j,k} = S \cdot \Phi_{j,k} ; \quad (17)$$

where indices (j,k) span the entire interferogram (e.g., 61) with deletions for discarded blocks (i.e., resulting from step 70). The value of S is a function of the specific IFSAR system and its collection geometry. Computing S is understood by those skilled in the art of radar interferometry.

In many interferometric height-finding problems, multiple points with known terrain heights may be available and can be readily used in the process embodiment 10 to achieve enhanced accuracy (step 110). Since the height accuracies at these points may vary, they are incorporated by adjusting, the determined heights within the retained transform blocks (e.g., 64) so as to minimize height differences in the overlap regions (e.g., 65). The mathematical formulation is a set of the difference equations which are iterated until convergence occurs.

By way of explanation, let Δh(u,v) be the set of height adjustments required to incorporate the additional tie points. Every pixel in transform block (u,v) is adjusted by Δh(u,v) for that block. Each Δh(u,v) should satisfy the difference equations:

$$\Delta h_{u,v} + hL_{u,v} = \Delta h_{u,v-1} + hR_{u,v-1} \quad (18)$$

$$\Delta h_{u,v} + hR_{u,v} + \Delta h_{u,v+1} + hL_{u,v+1}$$

$$\Delta h_{u,v} + hU_{u,v} = \Delta h_{u-1,v} + hD_{u-1,v}$$

$$\Delta h_{u,v} + hD_{u,v} = \Delta h j_{u+1,v} + \Delta h_{u+1,v} + hU_{u+1,v}$$

where hL, hR, hU, and hD are the average heights in the left, right, upper, and lower overlap regions of the transform blocks. Adding the equations and dividing by four yields:

$$\Delta h_{u,v} = \frac{1}{4} \cdot \begin{bmatrix} (\Delta h_{u-1,v} + \Delta h_{u,v+1} + \Delta h_{u-1,v} + \Delta h_{u+1,v}) \ldots + \\ hR_{u,v-1} - hL_{u,v} + hL_{u,v+1} - hR_{u,v} \ldots + \\ hL_{u-1,v} - hR_{u,v} + hU_{u+1,v} - hD_{u,v} \end{bmatrix} \quad (19)$$

This equation is executed iteratively starting with each of the Δh(u,v)=0. During the execution, if a given transform block has been previously discarded (e.g., as containing inconsistent data in step 70), its indices are skipped. If a given block contains a known tie point, its Δh is pre-computed (i.e., to be equal to the difference between the known tie point value and the value determined by steps 20 through 100) and held constant during the iteration. The iteration continues until the sum of the squared Δh values changes negligibly from one iteration to the next (e.g., less than about 0.1%), after which, for each retained transform block, the corresponding Δh value is added to all pixels in the block.

The Δh iterative solution described above serves to implement a weighted least-squares technique which minimizes the sum of the squared height differences in the overlap regions (e.g., 65) of the retained blocks, and which is constrained by the known tie-point heights (i.e., to be equal to the difference between the known tie point value and the value determined by steps 20 through 100).

A further effect of the Δh iteration is to smooth any inconsistencies which might arise in determining the constants of integration (step 90). For this reason, the iterative procedure may be executed even if only a single tie point is known. In this situation, only a single iteration is needed if consistent constants of integration have been found.

As will be appreciated, the foregoing description pertains to one embodiment of the present invention. The various aspects of the described invention may be used in other embodiments and may be extended in other applications. All such extensions and applications are intended to be within the scope of the present invention as defined by the claims that follow.

What is claimed is:

1. A method for determining height information from an interferogram of complex data samples generated from two complex images of an imaged terrain region acquired by an interferometric synthetic aperture radar system, wherein each of said complex data samples comprises a wrapped phase value, comprising:

dividing said interferogram into a plurality of transform blocks, wherein each transform block comprises a plurality of complex data samples, and wherein each of said transform blocks partially overlaps at least one adjacent, block in a corresponding overlapping region;

determining a difference value between the wrapped phase values of each set of adjacent complex data samples comprising a given transform block;

comparing each said difference value to a predetermined value, wherein all complex data samples comprising a given transform block are discarded when any single difference value corresponding with the transform block exceeds said predetermined value, and wherein all complex data samples comprising a transform block are retained when all difference values corresponding with the transform block are less than the predetermined value;

unwrapping a phase difference value for each of a plurality of retained data samples comprising an overlapping region corresponding with first and second transform blocks; and using a known height value corresponding with one of said plurality of complex data samples comprising said first transform block to establish an integration constant for the first transform block; and employing said integration constant for said first transform block and said unwrapped phase difference values to determine an integration constant for at least said second transform block.

2. A method as claimed in claim 1, said employing step comprising:

averaging the unwrapped phase difference values for the overlapping region of the first transform block to obtain a first average;

averaging the unwrapped phase difference values for the overlapping region of the second transform block to obtain a second average; and using the first average and the second average to determine the integration constant for the second transform block.

3. A method as claimed in claim 1, further comprising:

generating an integration constant for each of a first plurality of said transform blocks using said integration constraints for said first and second transform blocks and path-following.

4. A method as claimed in claim 3, further comprising:

smoothing the complex data samples comprising the interferogram using a spanning filter of a predetermined size, wherein said predetermined size is less than about one-half of said plurality of complex data samples comprising each said transform block.

5. A method as claimed in claim 1, wherein the total number of data samples comprising any one of said plurality of transform blocks is at least about 100.

6. A method as claimed in claim 5, wherein each transform block comprises a matrix of o×p data samples, where o and p=$2^n1$, and wherein n is an integer greater than 2.

7. A method as claimed in claim 5, wherein said overlapping region of comprises a total number of complex data samples that is between about 5% and 50% of the total number of data samples in the first transform block.

8. A method as claimed in claim 7, wherein said overlapping region is at least four complex data samples wide.

9. A method as claimed in claim 1, said unwrapping step comprising:

using a least-squares algorithm.

10. A method as claimed in claim 9, wherein said least squares algorithm is implemented by Fast Fourier Transform.

11. A method as claimed in claim 1, wherein said predetermined value is less than about 135°.

12. A method as claimed in claim 1, wherein said predetermined value is less than about 90°.

13. A method as claimed in claim 1, further comprising:

generating an irtegration constant for each of a first plurality of said retained transform blocks using said integration constants for said first and second transform blocks and path-following;

using a known height value corresponding with one of said plurality of complex data samples comprising a third transform block to establish an integration constant for the third transform block, wherein said third transform block is separated from said first plurality of said retained transform blocks;

generating an integration constant for each of a second plurality of said retained transform blocks using said integration constant for said third transform block and path-following.

14. A method as claimed in claim 1, further comprising:

using said integration constant for said second transform block to determine height values for the data samples comprising the second transform block; and employing a known height value corresponding with one of said plurality of complex data samples comprising one of said transform blocks, other than said first transform block, to determine a height adjustment value for application to said heights determined for said complex data samples comprising said second transform block.

15. A method for determining height information from an interferogram of complex data samples generated from two complex images of an imaged terrain region acquired by an interferometric synthetic aperture radar system, comprising:

dividing said irterferogram into a plurality of transform blocks, wherein each transform block comprises a plurality of complex data samples that each include a wrapped phase value;

determining a difference value between the wrapped phase values of each set of adjacent complex data samples comprising a transform block;

comparing each said difference value to a predetermined value, wherein all complex data samples comprising a transform block are discarded from further use in the method when any single difference value corresponding with the transform block exceeds said predetermined value, and wherein all complex data samples comprising a transform block are retained for further use in the method when all difference values corresponding with the transform block are less, than the predetermined value;

unwrapping a phase difference value for each of the retained complex data samples; and determining height values in corresponding relation to at least a portion of said plurality of retained complex data samples utilizing corresponding unwrapped phase difference values.

16. A method as claimed in claim 15, said unwrapping step comprising:

using a least-squares algorithm.

17. A method as claimed in claim 16, wherein said least-squares algorithm is implemented by Fast-Fourier Transform.

18. A method as claimed in claim 15, wherein each transform block comprises a matrix of o×p data samples, where o and $p=2_{n+}1$, and wherein n is an integer greater than 2.

19. A method as claimed in claim 15, said determining step comprising:

using a known height value corresponding with one of said plurality of complex data samples comprising a first retained transform block to establish an integration constant for the first retained transform block; and employing said integration constant for said first retained transform block and said unwrapped phase difference values to determine an integration constant for at least a second retained transform block.

20. A method as claimed in claim 19, said determining step further comprising:

using a predetermined phase-to-height conversion factor.

21. A method for determining height information from an interferogram of complex data samples generated from two complex images of an imaged terrain region acquired by an interferometric synthetic aperture radar system, comprising:

dividing said interferogram into a plurality of transform blocks, wherein each transform block comprises a plurality of complex data samples, and wherein at least a first of said transform blocks partially overlaps an adjacent, second transform block in an overlapping region, wherein said overlapping region includes complex data samples that partially comprise each of said first and second transform blocks;

unwrapping a phase difference value for each of the complex data samples comprising said overlapping region of said first and second transform blocks;

using a known height value corresponding with one of said plurality of complex data samples comprising said first transform block to establish an integration constant for the first transform block; and employing said integration constant for the first transform block and said unwrapped phase difference values to determine an integration constant for at least said second transform block.

22. A method as claimed in claim 21, said employing step comprising:

averaging the unwrapped phase difference values for the overlapping region of the first transform block to obtain a first average;

averaging the unwrapped phase difference values for the overlapping region of the second transform block to obtain a second average; and using the first average and the second average to determine the integration constant for the second transform block.

23. A method as claimed in claim 21, said unwrapping step comprising:

use of a least-squares algorithm implemented by Fast Fourier Transform.

24. A method as claimed in claim 21, further comprising:

analyzing of each of said plurality of transform blocks on a transform block-by-transform block basis to identify any inconsistencies in the complex data samples comprising each given transform block, wherein the only complex data samples utilized in the analysis of a given transform block are those corresponding with the given transform block being analyzed, and wherein all complex data samples comprising a given transform block are discarded when an inconsistency is identified with respect to the transform block and wherein all complex data samples comprising a given transform block are retained in the absence of the identification of an inconsistency corresponding with the transform block.

25. A method as claimed in claim 24, wherein each of said complex data samples comprises a wrapped phase value, and wherein for each of said plurality of transform blocks said analyzing step comprises:

determining a difference value between the wrapped phase values of each set of adjacent complex data samples comprising a transform block;

comparing each said difference value to a predetermine value, wherein all complex data samples comprising a transform block are discarded from further use in the method when any single difference value corresponding with the transform block exceeds said predetermined value, and wherein all complex data samples comprising a transform block are retained for further use in the method when all difference values corresponding with the transform block are less than the predetermined value.

26. A method as claimed in claim 24, wherein said analyzing step is completed after said unwrapping step and comprises:

rewrapping the unwrapped, complex data samples comprising each of said transform blocks to obtain rewrapped pixel data;

using said rewrapped pixel data for a given transform block and pixel data corresponding with said complex data samples for said given transform block to obtain a difference function;

wrapping difference data corresponding with said difference function to identify any said inconsistency.

27. A method as claimed in claim 24, further comprising:

generating an integration constant for each of a first plurality of said retained transform blocks using said integration constants for said first and second transform blocks and path-following;

using a known height value corresponding with one of said plurality of complex data samples comprising a third transform block to establish an integrating constant for the third transform block, wherein said third transform block is separated from said first plurality of said retained transform blocks;

generating an integration constant for each of a second plurality of said retained transform blocks using said integration constant for said third transform block and path-following.

\* \* \* \* \*

UNITED STATES PATENT AND TRADEMARK OFFICE
CERTIFICATE OF CORRECTION

PATENT NO. : 6,011,625
DATED : January 4, 2000
INVENTOR(S) : Glass

Page 1 of 1

It is certified that error appears in the above-identified patent and that said Letters Patent is hereby corrected as shown below:

Column 14, claim 6,
Line 51, please delete "$p=2^n 1$" and insert therefor -- $p=2^n +1$ --.

Column 15, claim 13,
Line 2, please delete "irtegration" and insert therefor -- integration --.

Column 15, claim 18,
Line 64, please delete "$p=2_{n+1}$" and insert therefor -- $p=2^n +1$ --.

Signed and Sealed this

First Day of January, 2002

Attest:

Attesting Officer

JAMES E. ROGAN
Director of the United States Patent and Trademark Office